United States Patent [19]
Brennan et al.

[11] Patent Number: 5,882,800
[45] Date of Patent: *Mar. 16, 1999

[54] POLYMERIC FILM HAVING AN ANTISTATIC COATING LAYER

[75] Inventors: William James Brennan; Noel Stephen Brabbs, both of Cleveland; Martin Wright, West Cornforth, all of England

[73] Assignee: Imperial Chemical Industries PLC, London, England

[*] Notice: This patent issued on a continued prosecution application filed under 37 CFR 1.53(d), and is subject to the twenty year patent term provisions of 35 U.S.C. 154(a)(2).

[21] Appl. No.: 425,172

[22] Filed: Apr. 20, 1995

[30] Foreign Application Priority Data

Apr. 20, 1994 [GB] United Kingdom .................. 9407803

[51] Int. Cl.$^6$ .................................................. B32B 27/36
[52] U.S. Cl. ............................................ 428/480; 428/704
[58] Field of Search ................................... 428/480, 704; 430/273.1, 637, 638, 631, 270.1

[56] References Cited

U.S. PATENT DOCUMENTS

| | | | |
|---|---|---|---|
| 3,136,655 | 6/1964 | Wolinski | 117/122 |
| 4,367,283 | 1/1983 | Nakayama et al. | 430/528 |
| 4,582,781 | 4/1986 | Chen et al. | 430/527 |
| 4,621,009 | 11/1986 | Lad | 428/216 |
| 4,806,571 | 2/1989 | Knobel et al. | 521/107 |
| 4,876,155 | 10/1989 | Thoese et al. | 428/480 |
| 4,943,510 | 7/1990 | Thoese et al. | 430/160 |
| 5,059,470 | 10/1991 | Fukuda et al. | 428/480 X |
| 5,122,303 | 6/1992 | Tieki | 252/518 |
| 5,219,128 | 6/1993 | Mizuno | 242/71.1 |
| 5,246,521 | 9/1993 | Shimura et al. | 156/241 |
| 5,366,783 | 11/1994 | Utsumi et al. | 428/480 X |
| 5,441,800 | 8/1995 | Utsumi | 428/480 X |

FOREIGN PATENT DOCUMENTS

| | | |
|---|---|---|
| 0172269 | 2/1986 | European Pat. Off. . |
| 0438114 | 7/1991 | European Pat. Off. . |
| 0449102 | 10/1991 | European Pat. Off. . |
| 0463400 | 1/1992 | European Pat. Off. . |
| 59-74554 | 4/1984 | Japan . |
| 63-122538 | 5/1988 | Japan ............................. B22B 27/36 |
| 838708 | 6/1960 | United Kingdom . |
| 1088984 | 10/1967 | United Kingdom . |
| 1092435 | 11/1967 | United Kingdom . |

OTHER PUBLICATIONS

English Translation of HEI 3–215550, Ozawa, Sep. 20, 1991.

*Primary Examiner*—Bernard P. Codd

[57] ABSTRACT

A polymeric film has a substrate layer of polyester material and an antistatic layer containing a polyester/polyalkylene oxide copolymer and a salt, the ratio by weight of copolymer/salt being in the range from 0.1 to 100/1. The copolymer is preferably a polyethylene terephthalate/polyethylene oxide block copolymer and the salt is preferably an alkali metal salt. The film exhibits low surface resistivity, even at low relative humidity.

18 Claims, No Drawings

POLYMERIC FILM HAVING AN ANTISTATIC COATING LAYER

This invention relates to a polymeric film, and in particular to a polyester film having an antistatic coating layer.

The tendency of polymeric, such as polyester, films to accumulate detrimental static electrical charges on surfaces thereof is well known. The presence of such charges creates a variety of problems including the attraction of dust and other contaminants to the film surface, the creation of a potential explosion hazard in the presence of organic solvents, difficulties in feeding the films through film handling and treating equipment, blocking, ie adhesion of the film to itself or to other films, and the risk of fogging of subsequently applied light-sensitive coating layers. Attempts have been made to improve the electrical surface conductivity of polyester films by coating the surface of the film with a wide variety of antistatic coating compositions, containing for example, ionic salts, anionic, cationic or non-ionic surfactants, and electroconductive polymers.

Unfortunately, prior art antistatic coating compositions generally suffer from one or more disadvantages. In particular, many antistatic agents function by absorbing water from the atmosphere, and consequently exhibit unacceptable antistatic properties at low humidity. There is a commercial requirement for a coated polyester film to provide improved antistatic properties at low humidity. Prior art antistatic coating layers may also exhibit relatively poor coat quality and/or poor adhesion to the underlying polyester film.

In order to achieve a viable economical process it is generally necessary to reclaim or recycle any coated scrap film. The recycling of many antistatic materials in the polyester film making process results in unacceptable colour formation.

We have now devised a polyester film coated with an antistatic layer which reduces or substantially overcomes at least one of the aforementioned problems.

Accordingly, the present invention provides a polymeric film comprising a substrate layer of polyester material having on at least one surface thereof an antistatic layer comprising a polyester/polyalkylene oxide copolymer and a salt, the ratio by weight of copolymer/salt being in the range from 0.1 to 100/1.

The invention also provides a method of producing a polymeric film by forming a substrate layer of polyester material, and applying to at least one surface thereof an antistatic layer comprising a polyester/polyalkylene oxide copolymer and a salt, the ratio by weight of copolymer/salt being in the range from 0.1 to 100/1.

A substrate for use in the production of a polymeric film according to the invention suitably comprises any polyester material capable of forming a self-supporting opaque, translucent or preferably transparent, film or sheet.

By a "self-supporting film or sheet" is meant a film or sheet capable of independent existence in the absence of a supporting base.

The substrate of a polymeric film according to the invention may be formed from any synthetic, film-forming, polyester material. Suitable thermoplastic, synthetic, materials include a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic glycol, eg ethylene glycol, 1,3-propanediol, 1,4-butanediol, neopentyl glycol and 1,4-cyclohexanedimethanol. A polyethylene terephthalate film or a polyethylene naphthalate film is preferred. A polyethylene terephthalate film is particularly preferred, especially such a film which has been biaxially oriented by sequential stretching in two mutually perpendicular directions, typically at a temperature in the range 70° to 125° C., and preferably heat set, typically at a temperature in the range 150° to 250° C., for example as described in GB-A-838708.

The polyester film substrate for production of a coated film according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics substrate material as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched polyester substrate film may be, and preferably is, dimensionally stabilised by heat-setting under dimensional restraint at a temperature above the glass transition temperature thereof.

A transparent substrate may comprise a particulate filler of small particle size, the presence of which improves the handleability of the film. The filler is preferably an inorganic filler, and may be selected from a wide range of filler materials such as silica, alumina, china clay, glass and/or silicone resin. Desirably, a filler, if employed in a transparent substrate layer, should be present in a small amount, generally not exceeding 1%, preferably less than 0.5%, more preferably less than 0.2%, by weight of the substrate. The average particle size of the filler is preferably in the range from 0.1 to 10 $\mu$m, more preferably 0.2 to 5 $\mu$m, and especially 0.5 to 3 $\mu$m.

In an alternative embodiment of the invention, the substrate is opaque, preferably exhibiting a Transmission Optical Density (Sakura Densitometer; type PDA 65; transmission mode) in the range from 0.75 to 1.75, more preferably 0.8 to 1.4, particularly 0.85 to 1.2, and especially 0.9 to 1.1. The substrate is suitably rendered opaque by incorporating therein an opacifying agent, preferably a voiding agent, such as an incompatible resin filler and/or a particulate inorganic filler.

By an incompatible resin is meant a resin which either does not melt, or which is substantially immiscible with the polyester substrate polymer, at the highest temperature encountered during extrusion and fabrication of the film. Such resins include polyamides and olefin polymers, particularly a homo- or co-polymer of a mono-alpha-olefin containing up to 6 carbon atoms in its molecule. The amount of incorporated incompatible resin filler is conveniently within a range from 0.5 to 50%, preferably 1 to 25%, and more preferably 5 to 10% by weight of the polyester substrate. A dispersing agent, such as a carboxylated polyolefin, particularly a carboxylated polyethylene, may be incorporated together with the incompatible resin filler, preferably olefin polymer, in the polyester substrate, in order to provide the necessary characteristics.

Particulate inorganic fillers suitable for generating an opaque substrate include conventional inorganic pigments and fillers, and particularly metal or metalloid oxides, such as alumina, silica and titania, and alkaline metal salts, such as the carbonates and sulphates of calcium and barium.

Particulate inorganic fillers may be of the voiding and/or non-voiding type. Suitable inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the substrate polymer. Titanium dioxide and barium sulphate are particularly preferred inorganic fillers.

Production of a substrate having satisfactory degrees of opacity, and preferably whiteness requires that the inorganic filler, particularly of barium sulphate, should be finely-divided, and the average particle size thereof is desirably from 0.01 to 10 $\mu$m. Preferably, the filler has an average particle size in the range from 0.05 to 5 $\mu$m, more preferably 0.1 to 3 $\mu$m, and particularly 0.5 to 1 $\mu$m.

The amount of inorganic filler, particularly of barium sulphate, for the production of an opaque substrate desirably should be not less than 1% nor exceed 30% by weight, based on the weight of the substrate polyester. Particularly satisfactory levels of opacity are achieved when the concentration of inorganic filler is in the range from about 5% to 25%, and especially 15% to 20% by weight of the substrate polyester.

The substrate is suitably of a thickness in the range from 6 to 300, particularly 50 to 250, and especially 80 to 150 $\mu$m.

The polyester/polyalkylene oxide copolymer is preferably a graft, or more preferably a block, copolymer containing one or more polyester repeat units and one or more polyalkylene oxide repeat units.

The polyester repeat unit comprises any one or more of the hereinbefore described polyester materials suitable for forming the substrate layer of a polymeric film according to the invention. It is preferred that the polyester repeat unit comprises polyethylene terephthalate, polybutylene terephthalate, polyethylene naphthalate and/or copolymers thereof, and/or copolymers comprising two or more of the respective monomers thereof. Ethylene terephthalate is a particularly preferred monomer component of the polyester repeat unit, especially as polyethylene terephthalate. In a preferred embodiment of the invention, at least one of the polyester monomers or repeat units, preferably the major component thereof, present in the polyester/polyalkylene oxide copolymer is the same as at least one of the polyester monomers or repeat units, preferably the major component thereof, present in the polyester of the substrate layer. Preferably the polyester component of both the polyester/polyalkylene oxide copolymer and the substrate polyester consist essentially of a single polyester monomer unit which is preferably the same, more preferably ethylene terephthalate. Consequently, the polyester component of both the polyester/polyalkylene oxide copolymer and the substrate polyester preferably consist essentially of polyethylene terephthalate.

The weight average molecular weight of the polyester repeat unit present in the polyester/polyalkylene oxide copolymer is preferably greater than 1000, more preferably in the range from 2000 to 40,000, especially 5000 to 30,000, and particularly 10,000 to 20,000. The polyester repeat unit preferably comprises greater than 5, more preferably in the range from 10 to 200, especially 25 to 150, and particularly 50 to 100 monomer units. By a monomer unit is meant, for example, a single ethylene terephthalate unit present in the preferred polyethylene terephthalate repeat unit.

The polyalkylene oxide repeat unit suitably comprises polyethylene oxide, polypropylene oxide, polytrimethylene oxide, polytetramethylene oxide, polybutylene oxide, and/or copolymers thereof, and/or copolymers comprising two or more of the respective monomers thereof. The polyalkylene oxide repeat unit preferably comprises polyethylene oxide, polypropylene oxide, and/or copolymers thereof. Ethylene oxide is a particularly preferred monomer component of the polyalkylene oxide repeat unit, especially as polyethylene oxide. The polyalkylene oxide repeat unit is suitably derived from the corresponding glycol monomer unit(s).

The molecular weight of the polyalkylene oxide repeat unit is preferably greater than 250, more preferably in the range from 300 to 10,000, especially 500 to 5000, and particularly 1000 to 2000. The polyalkylene oxide repeat unit preferably comprises greater than 8, more preferably in the range from 10 to 330, especially 16 to 160, and particularly 30 to 65 monomer units. By a monomer unit is meant a single alkylene oxide unit, ie derived from a single alkylene glycol. The polyalkylene oxide repeat unit is suitably formed by polymerising alkylene glycol. Thus, for example, ethylene glycol is polymerised to form polyethylene oxide.

The weight average molecular weight of the polyester/polyalkylene oxide copolymer can vary over a wide range but is preferably within the range from 25,000 to 250,000, more preferably 50,000 to 200,000, and especially 70,000 to 150,000.

The ratio of polyester/polyalkylene oxide present in the copolymer is preferably in the range from 1/0.5 to 10, more preferably 1/1 to 5, and especially 1/2 to 3 by weight. The molar ratio of the polyalkylene oxide monomer, preferably ethylene oxide, to the polyester monomer, preferably ethylene terephthalate, present in the copolymer is suitably in the range from 0.5 to 20011, preferably 2 to 50/1, more preferably 4 to 30/1, and especially 8 to 15/1.

The salt comprises at least one cation and at least one anion. The cation is suitably inorganic, preferably a metal ion such as an alkali metal, an alkaline earth metal, and/or ammonium ion. Examples of alkaline earth metals are beryllium, magnesium, calcium, strontium and barium. An alkali metal cation is particularly preferred.

By an alkali metal is meant an element of Group I-A of the Periodic Table of Elements displayed on page B3 of the Handbook of Chemistry and Physics, 46th edition (The Chemical Rubber Company). Examples of alkali metals include lithium, sodium, potassium and rubidium. The alkali metal cation is preferably lithium ion, sodium ion and/or potassium ion, more preferably lithium ion and/or sodium ion, and especially lithium ion.

The anion component of the salt preferably comprises an inorganic component, and more preferably both an inorganic and an organic component. Preferred inorganic components comprise a halide, ie fluoride, chloride, bromide or iodide, carboxylate, sulphonate, phosphate, chlorate, borate or thiocyanate. Preferred organic components comprise $C_1$–$C_{12}$, more preferably $C_1$–$C_6$, particularly $C_1$–$C_3$ alkyl groups, and especially where the hydrogen atoms are partially or completely replaced by fluorine atoms. Organic sulphonate anions are particularly preferred, and especially trifluoromethane sulphonate ($CF_3SO_3^-$).

The molecular weight of the salt is preferably less than 600, more preferably in the range from 25 to 400, particularly 50 to 300, and especially 80 to 200.

Particularly preferred salts are lithium trifluoromethane sulphonate, sodium trifluoromethane sulphonate, lithium chloride and lithium bromide.

The ratio of the polyester/polyalkylene oxide copolymer to salt present in the antistatic layer is in the range from 0.1 to 100:1, preferably 1 to 50:1, more preferably 1 to 30:1, particularly 3 to 15:1, and especially 3 to 12:1 by weight.

The molar ratio of the polyalkylene oxide monomer component of the copolymer, ie alkylene oxide, preferably ethylene oxide, to the salt is preferably in the range from 0.2 to 250:1, more preferably 2 to 130:1, particularly 2 to 80:1, and especially 6 to 40:1.

The invention is not limited to the addition of a single salt, and, if desired, two or more different salts, preferably alkali metal salts, may be present in the antistatic layer.

If desired, the antistatic layer coating composition may also contain a cross-linking agent which functions to cross-link the layer thereby improving adhesion to the polyester film substrate. Additionally, the cross-linking agent should preferably be capable of internal cross-linking in order to provide protection against solvent penetration. Suitable cross-linking agents may comprise epoxy resins, alkyd resins, amine derivatives such as hexamethoxymethyl melamine, and/or condensation products of an amine, eg melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines, with an aldehyde, eg formaldehyde. A useful condensation product is that of melamine with formaldehyde. The condensation product may optionally be alkoxylated. The cross-linking agent may suitably be used in amounts of up to 60%, preferably up to 50%, more preferably in the range from 20% to 45% by weight relative to the total weight of the antistatic layer. A catalyst is also preferably employed to facilitate cross-linking action of the cross-linking agent. Preferred catalysts for cross-linking melamine formaldehyde include para toluene sulphonic acid, maleic acid stabilised by reaction with a base, morpholinium paratoluene sulphonate, and ammonium nitrate.

An antistatic layer coated polyester film according to the invention preferably exhibits a Surface Resistivity (SR) not exceeding 12, more preferably not exceeding 11.5, and especially not exceeding 11 logohms/square at 30% Relative Humidity (RH). A particularly preferred and surprising feature of the present invention is that the aforementioned SR values can be maintained at low RH values, for example at 10% RH.

The antistatic layer coating composition may be applied before, during or after the stretching operation in the production of an oriented film. The antistatic layer coating composition is preferably applied to the polyester film substrate between the two stages (longitudinal and transverse) of a thermoplastics polyester film biaxial stretching operation. Such a sequence of stretching and coating is suitable for the production of a linear polyester film, particularly polyethylene terephthalate film, substrate, which is preferably firstly stretched in the longitudinal direction over a series of rotating rollers, coated, and then stretched transversely in a stenter oven, preferably followed by heat setting.

A polyester, especially polyethylene terephthalate, sub-substrate, which has been coated with an antistatic layer, is suitably heated up to 240° C., preferably up to 220° C., in order to dry the aqueous medium, or the solvent in the case of solvent-applied compositions, and also to assist in coalescing and forming the coating into a continuous and uniform layer. The cross-linking of cross-linkable coating compositions is also achieved at such temperatures.

The antistatic layer coating composition is preferably applied to the polyester film substrate by any suitable conventional technique such as dip coating, bead coating, reverse roller coating or slot coating.

The ratio of substrate to antistatic layer thickness may vary within a wide range, although the thickness of the antistatic layer suitably should not be less than 0.001% nor greater than 10% of that of the substrate, and is preferably in the range from 0.002% to 5%, more preferably 0.004% to 0.5% of the substrate.

The antistatic layer is preferably applied to the polyester substrate at a dry coat weight in the range from 0.05 to 5 mgdm$^{-2}$, especially 0.1 to 2.0 mgdm$^{-2}$. The thickness of the dry antistatic layer is preferably less than 1.5 $\mu$m, more preferably in the range from 0.01 to 1.0 $\mu$m, and particularly 0.02 to 0.5 $\mu$m. For films coated on both surfaces, each antistatic layer preferably has an antistatic coat weight and antistatic layer thickness within the preferred ranges.

Prior to deposition of the antistatic layer onto the polyester substrate, the exposed surface thereof may, if desired, be subjected to a chemical or physical surface-modifying treatment to improve the bond between that surface and the subsequently applied antistatic layer. A preferred treatment, because of its simplicity and effectiveness, is to subject the exposed surface of the substrate to a high voltage electrical stress accompanied by corona discharge. Alternatively, the substrate may be pre-treated with an agent known in the art to have a solvent or swelling action on the polyester substrate, for example a halogenated phenol dissolved in a common organic solvent, eg a solution of p-chloro-m-cresol, 2,4-dichlorophenol, 2,4,5- or 2,4,6-trichlorophenol or 4-chlororesorcinol in acetone or methanol.

One or more of the layers of a polymeric film according to the invention, ie substrate, antistatic and/or optional additional coating layer(s), may conveniently contain any of the additives conventionally employed in the manufacture of polymeric films. Thus, agents such as dyes, eg blue dyes for photographic film, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated in the substrate and/or antistatic layer (s), as appropriate. In one embodiment of the invention the antistatic layer comprises a filler, preferably at a concentration in the range from 0.01% to 2%, more preferably 0.03% to 1%. Silica is a suitable filler, preferably having an average particle size in the range from 0.005 $\mu$m to 2.0 $\mu$m, more preferably 0.3 $\mu$m to 0.7 $\mu$m.

The invention is illustrated by reference to the following examples.

EXAMPLE 1

A polyethylene terephthalate film was melt extruded, cast onto a cooled rotating drum and stretched in the direction of extrusion to approximately 3.5 times its original dimensions. The monoaxially oriented polyethylene terephthalate substrate film was coated on one side with an antistatic layer coating composition comprising the following ingredients:

| | |
|---|---|
| Permalose ™ (14.6% w/w aqueous dispersion of polyethylene terephthalate/polyethylene oxide copolymer, supplied by ICI) | 408.6 g |
| Lithium trifluoromethane sulphonate ($CF_3SO_3Li$) (10% w/w aqueous solution) | 59.5 g |
| Synperonic NP10 (10% w/w aqueous solution of alkyl phenol ethoxylate, supplied by ICI) | 15 ml |
| Demineralised water | to 2.5 liters |

The coated film was passed into a stenter oven, where the film was stretched in the sideways direction to approximately 3.5 times its original dimensions. The coated biaxially stretched film was heat set at a temperature of about 220° C. by conventional means. Final film thickness was 75 μm. The dry coat weight of the antistatic layer was approximately 0.3 $mgdm^{-2}$ and the thickness was approximately 0.03 μm.

The Surface Resistivity (SR) of the coated film was measured at 10% and 30% Relative Humidity (RH). The results are given in Table 1.

The reclaimabilty of the antistatic layer coated film was examined by converting the film to flakes, extruding at a temperature of 280° C., pelletising, extruding and repeating the pelletising/extruding cycle two more times. The final pellets showed, on a visual inspection, no significant increase in colour formation (principally "yellowing") compared to pellets originating from an uncoated control polyethylene terephthalate film.

EXAMPLE 2

This is a comparative example not according to the invention. The procedure of Example 1 was repeated except that the coating composition did not contain any salt. The overall solids content of the coating layer was maintained.

The Surface Resistivity (SR) of the coated film was measured at 10% and 30% Relative Humidity (RH). The results are given in Table 1.

EXAMPLE 3

This is a comparative example not according to the invention. The procedure of Example 1 was repeated except that the coating composition did not contain any Permalose TM. The overall solids content of the coating layer was maintained.

The Surface Resistivity (SR) of the coated film was measured at 10% and 30% Relative Humidity (RH). The results are given in Table 1.

EXAMPLE 4

The procedure of Example 1 was repeated except that the coating composition contained sodium trifluoromethane sulphonate ($CF_3SO_3Na$) instead of $CF_3SO3Li$.

The Surface Resistivity (SR) of the antistatic layer coated film was measured at 10% and 30% Relative Humidity (RH). The results are given in Table 1.

EXAMPLE 5

The procedure of Example 1 was repeated except that the coating composition contained lithium chloride instead of $CF_3SO_3Li$.

The Surface Resistivity (SR) of the antistatic layer coated film was measured at 10% and 30% Relative Humidity (RH). The results are given in Table 1.

EXAMPLE 6

The procedure of Example 1 was repeated except that the coating composition contained lithium bromide instead of $CF_3SO_3Li$.

The Surface Resistivity (SR) of the antistatic layer coated film was measured at 10% and 30% Relative Humidity (RH). The results are given in Table 1.

EXAMPLE 7

The procedure of Example 1 was repeated except that the coating composition contained lithium thiocyanate ($LiSCN.H_2O$) instead of $CF_3SO_3Li$.

The Surface Resistivity (SR) of the antistatic layer coated film was measured at 10% and 30% Relative Humidity (RH). The results are given in Table 1.

The above examples illustrate the improved properties of polymeric films of the present invention.

TABLE 1

| | | Surface Resistivity (logohm/square) | |
|---|---|---|---|
| Example No | Salt | 30% RH | 10% RH |
| 1 | $CF_3SO_3Li$ | 10.2 | 11.0 |
| 2 (Comparative) | — | 12.5 | 14.0 |
| 3* (Comparative) | $CF_3SO_3Li$ | 9.7 | 13.2 |
| 4 | $CF_3SO_3Na$ | 10.8 | 11.2 |
| 5 | LiCl | 10.6 | 11.0 |
| 6 | LiBr | 10.4 | 11.1 |
| 7 | $LiSCN.H_2O$ | 11.0 | 11.3 |

*No Permalose ™ present in the coating layer

We claim:

1. A polymeric film comprising a substrate layer of polyester material having on at least one surface thereof an antistatic layer consisting essentially of (a) a polyester/polyalkylene oxide copolymer and a salt having a molecular weight up to 300, the ratio by weight of copolymer/salt being in the range from 0.1 to 100/1 and (b) 0 to 60% by weight of the antistatic layer containing a crosslinking agent with an optional catalyst.

2. A polymeric film according to claim 1 wherein the ratio of the polyester/polyalkylene oxide copolymer to salt is in the range from 1 to 50:1 by weight.

3. A polymeric film according to claim 2 wherein the ratio is in the range of 3 to 15:1.

4. A polymeric film according to claim 1 wherein the salt comprises an alkali metal salt.

5. A polymeric film according to claim 4 wherein the alkali metal salt comprises lithium cation.

6. A polymeric film according to claim 5 wherein the alkali metal salt is lithium trifluoromethane sulphonate.

7. A polymeric film according to claim 1 wherein the salt comprises sulphonate anion.

8. A polymeric film according to claim 7 wherein the alkali metal salt is sodium trifluoromethane sulphonate.

9. A polymeric film according to claim 1 wherein the molar ratio of the polyalkylene oxide monomer component of the copolymer to the salt is in the range from 0.2 to 250:1.

10. A polymeric film according to claim 1 wherein the same polyester repeat unit is present in both the polyester/polyalkylene oxide copolymer and the polyester of the substrate layer.

11. A polymeric film according to claim 1 wherein the polyalkylene oxide component of the copolymer comprises polyethylene oxide.

12. A polymeric film according to claim 1 wherein the antistatic layer has a Surface Resistivity of less than 12 logohms/square at 30% Relative Humidity.

13. A polymeric film according to claim 12 wherein the antistatic layer has a Surface Resistivity of less than 11 logohms/square at 30% Relative Humidity.

14. A polymeric film according to claim 1 wherein the antistatic layer has a Surface Resistivity of less than 12 logohms/square at 10% Relative Humidity.

15. A polymeric film according to claim 14 wherein the antistatic layer has a Surface Resistivity of less than 11 logohms/square at 10% Relative Humidity.

16. A method of producing a polymeric film by forming a substrate layer of polyester material, and applying to at least one surface thereof an antistatic layer consisting essentially of (a) a polyester/polyalkylene oxide copolymer and a salt having a molecular weight up to 300, the ratio by weight of the copolymer/salt being in the range from 0.1 to 100/1, and (b) 0–60% by weight of the antistatic layer containing a crosslinking agent with an optional catalyst.

17. A polymeric film comprising a substrate layer of polyester material having on at least one surface thereof an antistatic layer consisting essentially of (a) a polyester/polyalkylene oxide copolymer and an alkali metal salt having a molecular weight up to 300, the ratio by weight of copolymer/salt being in the range from 1 to 30/1 and (b) 0 to 60% by weight of the antistatic layer containing a crosslinking agent with an optional catalyst.

18. A polymeric film comprising a substrate layer of polyester material having on at least one surface thereof an antistatic layer consisting essentially of (a) a polyester/polyalkylene oxide copolymer and a salt having a molecular weight up to 300, the ratio by weight of copolymer/salt being in the range from 0.1 to 100/1, and the same polyester repeat unit is present in both the polyester/polyalkylene oxide copolymer and the polyester of the substrate layer and (b) 0 to 60% by weight of the antistatic layer containing a crosslinking agent with an optional catalyst.

* * * * *